United States Patent
Soerensen et al.

(10) Patent No.: US 11,428,213 B2
(45) Date of Patent: Aug. 30, 2022

(54) BEARING ARRANGEMENT FOR A WIND TURBINE AND WIND TURBINE

(71) Applicant: Siemens Gamesa Renewable Energy A/S, Brande (DK)

(72) Inventors: Morten Soerensen, Horsens (DK); Frank Bak, Aarhus (DK); Edom Demissie, Sheffield (GB); Niels Karl Frydendal, Herning (DK); Vujadin Petronic, Brande (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 15/931,863

(22) Filed: May 14, 2020

(65) Prior Publication Data

US 2020/0362828 A1 Nov. 19, 2020

(30) Foreign Application Priority Data

May 16, 2019 (EP) .................... 19174852

(51) Int. Cl.
*F03D 80/70* (2016.01)
*F03D 9/25* (2016.01)
*F03D 17/00* (2016.01)

(52) U.S. Cl.
CPC ............... *F03D 80/70* (2016.05); *F03D 9/25* (2016.05); *F03D 17/00* (2016.05);
(Continued)

(58) Field of Classification Search
CPC . F03D 80/70; F03D 9/25; F03D 17/00; F05B 2240/221; F05B 2240/54; F05B 2240/57; F05B 2260/98
(Continued)

(56) References Cited

U.S. PATENT DOCUMENTS

| | | | | |
|---|---|---|---|---|
| 2012/0070280 | A1* | 3/2012 | Wadehn | F16C 17/02 416/1 |
| 2012/0099993 | A1* | 4/2012 | Guerenbourg | F16C 35/02 416/174 |
| 2018/0030964 | A1* | 2/2018 | Eriksen | F16C 17/26 |

FOREIGN PATENT DOCUMENTS

| | | |
|---|---|---|
| CN | 201779151 U | 3/2011 |
| CN | 110630743 A | 12/2019 |

(Continued)

OTHER PUBLICATIONS

Translation of DE 10 2015 221 412 A1 (Year: 2015).*
Extended European Search Report in corresponding European Patent Application No. 19174852.4 dated Nov. 21, 2019. 8 pages.

*Primary Examiner* — Sean Gugger
(74) *Attorney, Agent, or Firm* — Schmeiser, Olsen & Watts LLP (57) ABSTRACT

A bearing arrangement for a wind turbine including a bearing housing and a drive shaft, whereby the drive shaft is arranged within the bearing housing in an axial direction along a longitudinal axis of the bearing housing, the bearing arrangement further comprising a downwind bearing and an upwind bearing as radial fluid bearings, whereby the downwind bearing and the upwind bearing are arranged between the bearing housing and the drive shaft is provided. The downwind bearing and/or the upwind bearing includes a lubricant flooded chamber, in which multiple radial bearing pads are arranged about the drive shaft, whereby the lubricant flooded chamber is sealed against the drive shaft, an internal space of the bearing housing and an outside of the bearing housing is also provided.

13 Claims, 10 Drawing Sheets (52) U.S. Cl.
CPC ..... *F05B 2240/221* (2013.01); *F05B 2240/54* (2013.01); *F05B 2240/57* (2013.01); *F05B 2260/98* (2013.01)

(58) Field of Classification Search
USPC ..................................................... 290/44, 55
See application file for complete search history.

(56) References Cited

FOREIGN PATENT DOCUMENTS

| | | |
|---|---|---|
| DE | 102015221412 A1 | 5/2017 |
| EP | 3219984 A1 | 9/2017 |
| EP | 3252306 A1 | 12/2017 |
| EP | 3276192 A1 | 1/2018 |
| EP | 3460238 A1 | 3/2019 |
| EP | 3460268 A1 | 3/2019 |
| EP | 3460269 A1 | 3/2019 |
| EP | 3460270 A1 | 3/2019 |
| EP | 3460271 A1 | 3/2019 |
| EP | 3557042 A1 | 10/2019 |
| EP | 3577356 A1 | 12/2019 |
| EP | 3577361 A1 | 12/2019 |
| WO | 2010045913 A2 | 4/2010 |
| WO | 2018024410 A1 | 2/2018 |

\* cited by examiner

BEARING ARRANGEMENT FOR A WIND TURBINE AND WIND TURBINE

CROSS-REFERENCE TO RELATED APPLICATIONS

This application claims priority to European Patent Application No. 19174852.4, having a filing date of May 16, 2019, the entire contents of which are hereby incorporated by reference.

FIELD OF TECHNOLOGY

The following relates to a bearing arrangement for a wind turbine and a wind turbine.

BACKGROUND

In general, bearing arrangements of wind turbines comprise a bearing housing and a drive shaft, whereby the drive shaft is arranged within the bearing housing in an axial direction along a longitudinal axis of the bearing housing. Bearings of the bearing arrangement are arranged about the drive shaft, so that the drive shaft can be rotated within the bearing housing by means of a rotor of the wind turbine. Such a bearing arrangement is known from EP 3 276 192 A1, for example.

The bearings of the bearing arrangement need to be constantly lubricated to function properly. Current solutions are cumbersome in that they involve individual lubrication of bearing components of the bearings, complicated control systems with multiple high-pressure and low-pressure lines and multiple pumps. Further, these components are susceptible to failure and due to the large number of components in the bearings, downtimes of wind turbines occur more often than desired.

SUMMARY

An aspect relates eliminating or at least reducing disadvantages in the prior art techniques related to the lubrication of bearings in a bearing arrangement, in particular to provide a bearing arrangement for a wind turbine with a simple and cost-efficient lubrication concept having little failure rate and little maintenance effort.

An aspect relates to a bearing arrangement of a wind turbine and a wind turbine. Further details of the embodiment of the present invention unfold from the other claims as well as the description and the drawings. Thereby, the features and details described in connection with the bearing arrangement of the embodiment of the present invention apply in connection with the wind turbine of the embodiment of the present invention, so that regarding the disclosure of the individual aspects of the embodiment of the present invention it is or can be referred to one another.

According to a first aspect of the embodiment of the present invention relates to a bearing arrangement for a wind turbine comprising a bearing housing and a drive shaft, whereby the drive shaft is arranged within the bearing housing in an axial direction along a longitudinal axis of the bearing housing, the bearing arrangement further comprising a downwind bearing and an upwind bearing as radial fluid bearings, whereby the downwind bearing and the upwind bearing are arranged between the bearing housing and the drive shaft, whereby the downwind bearing and/or the upwind bearing comprises a lubricant flooded chamber, in which multiple radial bearing pads are arranged about the drive shaft, whereby the lubricant flooded chamber is sealed against the drive shaft, an internal space of the bearing housing and an outside of the bearing housing.

In the bearing arrangement of the embodiment of the present invention, the lubricant inside the lubricant flooded chamber cannot leave the lubricant flooded chamber other than by means of leakage. The lubricant flooded chamber in the sense of the embodiment of the present invention therefore is a chamber flooded with lubricant, whereby the lubricant is contained in the lubricant flooded chamber. The lubricant may be oil, for example. By means of the embodiment of the present invention, a passive lubrication system is provided, in which the lubricant is contained. Due to the lubricant not being circulated through several lines and pumps, the provided passive lubrication system requires little maintenance, is less susceptible to failure, simple and cost-efficient.

The downwind bearing is in particular arranged about a downwind portion of the drive shaft. The upwind bearing is in particular arranged about an upwind portion of the drive shaft. The downwind bearing may alternatively be referred to as a back-end bearing arranged about a back-end portion of the drive shaft. The upwind bearing may alternatively be referred to as a front-end bearing arranged about a front-end portion of the drive shaft. In a wind turbine, the front-end of the drive shaft is located closer to the rotor than its back-end.

The downwind bearing and/or the upwind bearing are radial fluid bearings. Lubricant such as oil is provided as fluid in the radial fluid bearings. The downwind bearing and/or the upwind bearing comprises multiple radial bearing pads arranged about the drive shaft. The multiple radial bearing pads may be arranged in series and/or in a circular arrangement about the drive shaft.

The lubricant flooded chamber comprises a lubricant inlet. Thereby, the lubricant flooded chamber may be refilled with lubricant to compensate for a loss of lubricant by means of leakage.

Moreover, the lubricant inlet of the lubricant flooded chamber is fluidically connected via a lubricant pump to the bearing housing. Thereby, the leaked lubricant can be recirculated to the lubricant flooded chamber. This eliminates a necessity to remove the leaked lubricant from the bearing housing and to provide the downwind bearing and/or the upwind bearing with lubricant from other sources, which would need to be provided.

Further, the lubricant flooded chamber is connected to a drain outlet of the bearing housing or a collecting sump of the bearing housing, whereby the collecting sump is arranged underneath the drain outlet. Thereby, a recirculation of the lubricant leaked into an internal space of the bearing housing is facilitated. In the collecting sump, the lubricant may be collected. Thereby, no costly parts such as a lubrication tank for collecting the lubricant and a lubrication tank pump for pumping the lubricant to the lubrication tank are necessary. The collecting sump in particular has at least one drain opening. The lubricant collected in the collecting sump can leave the collecting sump by means of the drain opening. The collecting sump may be a separate part attached to the bottom part of the bearing housing. In particular, the collecting sump may be directly attached to the bottom part of the bearing housing. The collecting sump may be conveniently attached to the bottom part of the bearing housing by means of bolts, for example. Providing the collecting sump as a separate part enables simple manufacture of collecting sumps with complex geometries. Moreover, collecting sumps may be easily serviced or changed. A change may be necessary when, for example, the upwind bearing and/or the downwind bearing leaks more oil than expected or over the course of the operation of the wind turbine, so that a larger collecting sump is necessary. Alternatively, the collecting sump may be integrally formed, in particular monolithically designed, with the bottom part of the bearing housing. The collecting sump may have a longitudinal extension in an axial direction along a longitudinal axis of the bearing housing. In particular, the longitudinal extension of the bearing housing may be at least two, three or four times the length of a largest extension of the bearing housing perpendicular to an axial direction along the longitudinal axis of the bearing housing. Thereby, the assembly space underneath the bearing housing is effectively used. A further collecting sump may be arranged underneath the collecting sump. The further collecting sump may be attached, in particular directly attached, to the bottom part of the bearing housing or the collecting sump by means of bolts, for example. The further collecting sump may comprise a drain opening. The further collecting sump together with the collecting sump provides a type of double sealed sump chamber. Therein, when the collecting sump leaks, for example through its attachment means to the bottom part of the bearing housing, the further collecting sump provides a further seal to collect the lubricant. Thereby, the likelihood of leakage of the lubricant out of the bearing housing is reduced.

The lubricant flooded chamber is fluidically connected to an effective path provided by a lubricant flow channel of an axial bearing of the bearing arrangement. The effective path of the axial bearing is the path between to parts of the axial bearing, which come into contact when a force is applied onto the axial bearing, in particular due to a thrust of the drive shaft in the axial direction of the drive shaft. Thereby, the advantages of the lubricant flooded chamber are extended to an axial bearing, which is lubricated by the lubricant contained in the lubricant flooded chamber. This reduces maintenance requirements and failure rate of the axial bearing.

In particular, the axial bearing may comprise an axial collar and multiple axial bearing pads attached to an axial bearing stop, whereby the lubricant flow channel of the axial bearing is formed between the axial collar and the multiple axial bearing pads. In such a design, the contacting parts of the axial bearing are the axial collar and the multiple axial bearing pads. The axial bearing pads may be attached to the axial bearing pad by means of axial bearing bodies. The axial bearing bodies may comprise axial tiltable support structures. The axial tiltable support structures are tiltable with respect to the axial collar. The axial tiltable support structures may in particular comprise a ball head, which is tiltable. The ball heads may be arranged in ball sockets of the thrust bearing bodies.

In particular, the downwind bearing and/or the upwind bearing comprising the lubricant flooded chamber may be a radial fluid bearing comprising a cylindrical seat within the bearing housing, multiple radial bearing bodies arranged on the cylindrical seat and multiple radial tiltable support structures secured to the multiple radial bearing bodies, whereby each one of a multiple radial bearing pads is attached to one of the multiple radial tiltable support structures. The multiple radial tiltable support structures are tiltable with respect to the drive shaft. The multiple radial tiltable support structures may comprise ball heads and the multiple radial bearing bodies may comprise ball sockets for the ball heads.

The downwind bearing and/or the upwind bearing comprising the lubricant flooded chamber comprises an inner sealing for sealing the lubricant flooded chamber against the internal space of the bearing housing, whereby the inner sealing comprises multiple inner sealing plates. The multiple inner sealing plates may also be referred to as segments of the inner sealing. The inner sealing plates or segments may simply be replaced when they do not provide sufficient sealing anymore rather than replacing the entire inner sealing. Also, an optimized weight distribution by means of the multiple inner sealing plates can be achieved.

In particular, the multiple inner sealing plates have a part-circular shape and are arranged so as to form a circular shaped inner sealing. Further, a lip seal may be arranged between the drive shaft and the inner sealing. Also, a series of at least two lip seals adjacent to one another may be arranged between the drive shaft and the inner sealing. A lip seal generally may have a circular or oval shape. A lip seal may provide a spring loading function. A lip seal may comprise a rubber material, for example.

Further, at least one of the inner sealing plates comprises at least one overflow opening from the lubricant flooded chamber to the internal space of the bearing housing. In particular, the inner sealing plate located at a top (relative to the direction of gravity) of the bearing housing comprises the at least one overflow opening. Thereby, when too much lubricant is contained in the lubricant flooded chamber, lubricant can be released into the bearing housing so as to prevent an overfilling of the lubricant flooded chamber with lubricant.

In an exemplary embodiment the downwind bearing and/or the upwind bearing comprising the lubricant flooded chamber comprises an outer sealing for sealing the lubricant flooded chamber against the outside of the bearing housing, whereby the outer sealing comprises an outer seal plate. Thereby, it is prevented that lubricant is released into the outside of the bearing housing, in particular the nacelle. The drive shaft may be inclined relative to a line perpendicular to a direction of gravity, for example by 7.5°, so that the lubricant is less likely to leave the lubricant flooded chamber through the outer sealing.

The outer sealing comprises at least one lip seal for sealing the outer sealing against the drive shaft. Moreover, a series of at least two lip seals adjacent to one another may be arranged for sealing the outer sealing against the drive shaft.

Moreover, a dust sealing is attached to the outer sealing for preventing the entering of dust into the lubricant flooded chamber through the lip seal, whereby the dust sealing comprises a dust seal plate and a lip seal. Thereby, it is prevented that foreign particles may entire the lubricant flooded chamber, which may damage components of the bearing. Moreover, the dust sealing provides a further sealing for ensuring that no lubricant can leave the lubricant flooded chamber to the outside of the bearing house.

The lubricant flooded chamber comprises a lubricant level sensor. A computing unit may be connected to at least one lubricant level sensor and the downwind bearing and/or the upwind bearing. The computing unit may further be connected to the lubricant pump for recirculating the lubricant leaked into the internal space of the bearing housing to the lubricant flooded chamber.

In particular, the drain outlet may be arranged in a bottom part of the bearing housing, the bottom part of the bearing housing being located underneath the drive shaft in a direction of gravity. At least one inner side of the bottom part of the bearing housing may be arranged so as to form a funnel, whereby the drain outlet is an opening of the formed funnel. The funnel may have a concave shape or a substantially concave shape, for example. The drain outlet may be located closer to a center of the bottom part of the bearing housing in an axial direction along the longitudinal axis than to the downwind bearing and the upwind bearing and/or the drain outlet may be located closer to the center of the bottom part of the bearing housing in a direction perpendicular to an axial direction along the longitudinal axis than to ends of the bottom part of the bearing housing located opposite to each other in the perpendicular direction. A passive filter may be arranged after the drain outlet for filtering the drained lubricant.

According to a second aspect of the embodiment of the present invention relates to a wind turbine comprising a bearing arrangement according to the embodiment of the present invention, whereby the wind turbine further comprises a rotor connected to drive the drive shaft and a generator connected to be driven by the drive shaft.

The generator may be a direct drive generator or a geared generator having a gearbox, for example. The rotor is also commonly referred to as a hub of the wind turbine. Two, three or more wind turbine blades may be attached to the rotor or hub. The wind turbine may further comprise a nacelle, which may be supported on a supporting tower of the wind turbine. The nacelle may comprise the bearing arrangement. The bearing arrangement, in particular the bearing housing, and the generator may be attached to the nacelle and/or the tower.

BRIEF DESCRIPTION

Some of the embodiments will be described in detail, with reference to the following figures, wherein like designations denote like members, wherein.

DETAILED DESCRIPTION

Same objects in FIGS. 1 to 10 are denominated with the same reference number. If there is more than one object of the same kind in one of the figures, the objects are numbered in ascending order with the ascending number of the object being separated from its reference number by a dot. The specific dimensions of features and parts in the figures are exemplary and may be enlarged for ease of reference only.

Figure 1:
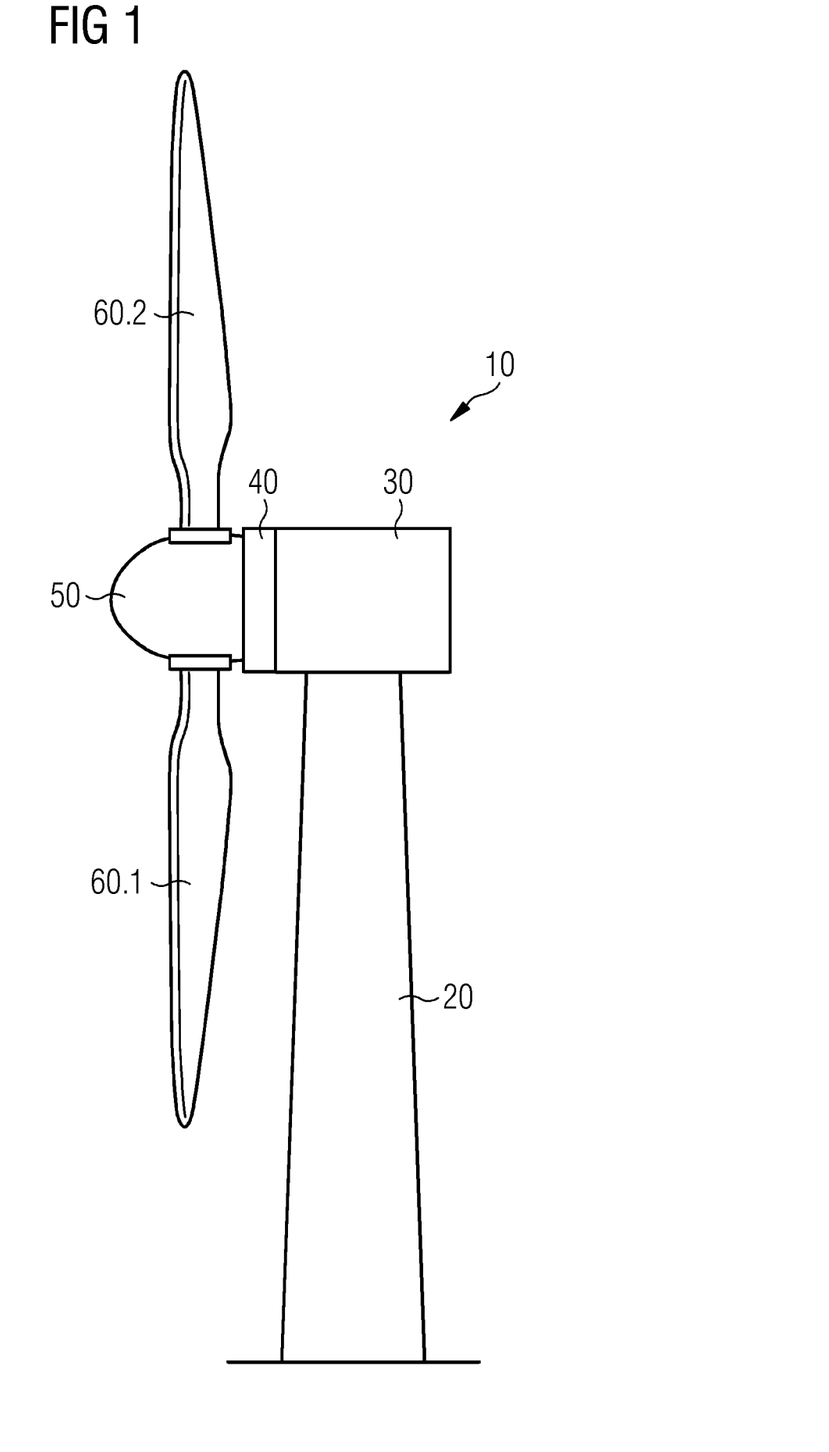
FIG. 1 depicts a side view on a wind turbine.

FIG. 1 shows a side view on a wind turbine 10. The wind turbine 10 comprises a supporting tower 20 and a nacelle 30, whereby the nacelle 30 is attached to the supporting tower 20. The nacelle 30 comprises a bearing arrangement 70, which is not shown in FIG. 1 but can be seen in FIG. 2. The wind turbine 10 further comprises a generator 40 attached to a rotor 50 of the wind turbine 10. Two wind turbine blades 60.1, 60.2 are attached to the rotor 50.

Figure 2:
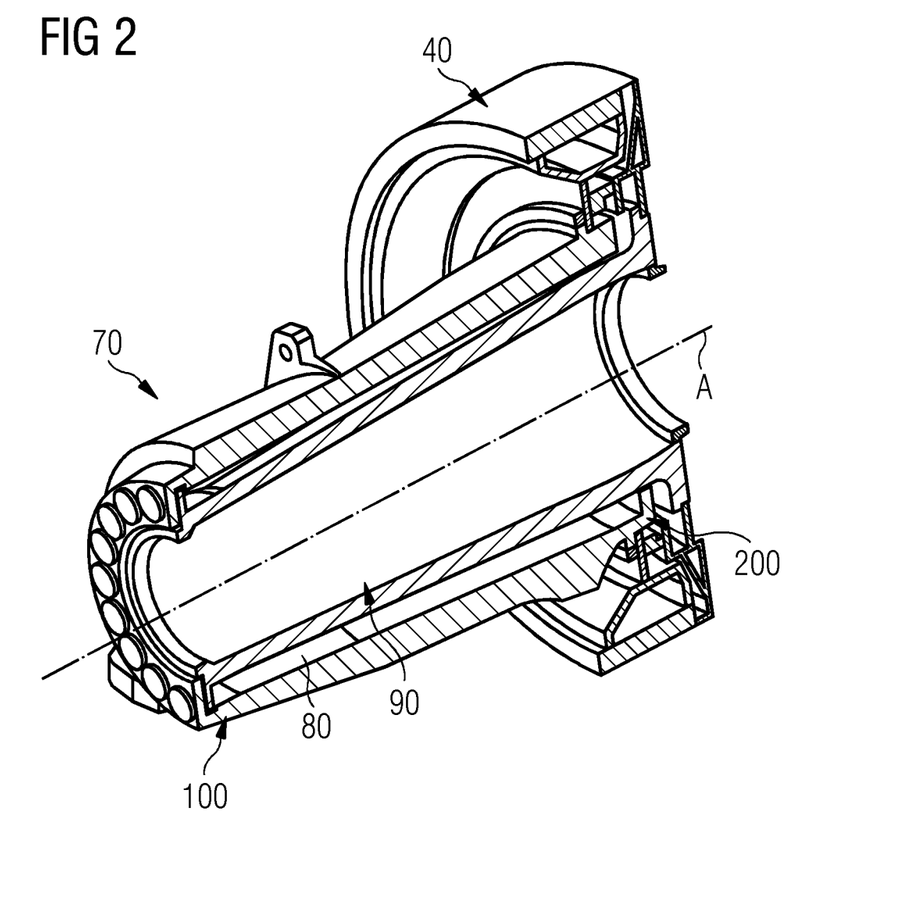
FIG. 2 depicts a side perspective view on a sectional cut along the longitudinal axis of a bearing arrangement of the wind turbine of FIG. 1.

FIG. 2 shows a side perspective view on a sectional cut along the longitudinal axis A of the bearing arrangement 70 of the wind turbine 10 of FIG. 1. The bearing arrangement 70 comprises a bearing housing 80 and a drive shaft 90, whereby the drive shaft 90 is arranged within the bearing housing 80 in an axial direction along the longitudinal axis A of the bearing housing 80 as indicated in FIG. 2. An axial direction along a longitudinal axis A of the bearing housing 80 corresponds to an axial direction of the drive shaft 90. The bearing arrangement 90 further comprises a downwind bearing 100 and an upwind bearing 200, whereby the downwind bearing 100 and the upwind bearing 200 are arranged between the bearing housing 80 and the drive shaft 90. In particular, the downwind bearing 100 is arranged about a downwind portion of the drive shaft 90 and the upwind bearing 200 is arranged about an upwind portion of the drive shaft 90. The drive shaft 90 is operatively connected to the generator 40. The generator 40 is shown as a direct drive generator. However, it is also possible to provide the generator 40 as a geared generator, for example.

Figure 3:
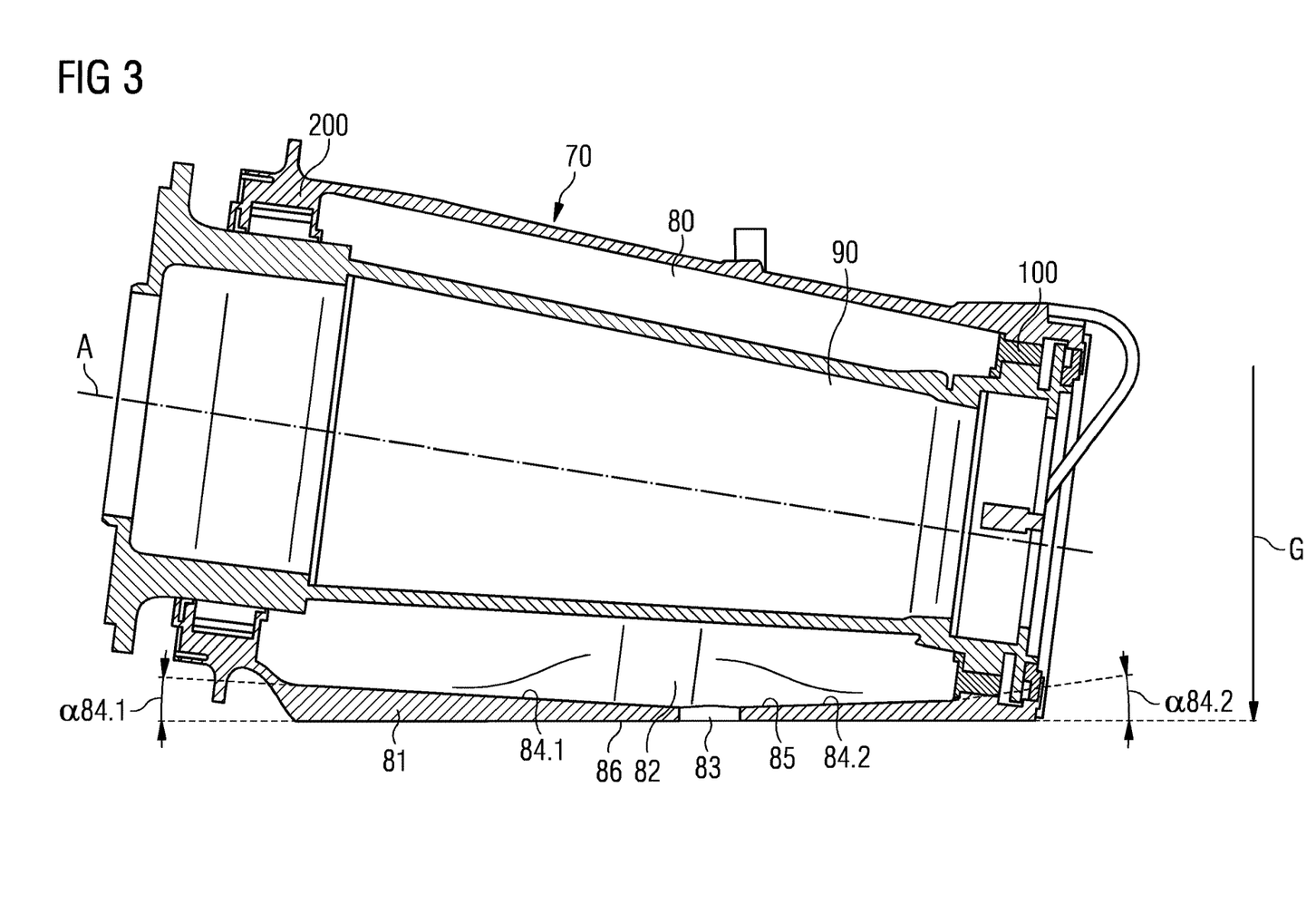
FIG. 3 depicts a side view on the sectional cut along the bearing arrangement of FIG. 2.

FIG. 3 shows a side view on the sectional cut along the bearing arrangement 70 of FIG. 2. The bearing housing 80 comprises a drain outlet 83 arranged in a bottom part 81 of the bearing housing 80. The drain outlet 83 is located closer to a center of the bottom part 81 of the bearing housing 80 in an axial direction along the longitudinal axis A than to the downwind bearing 100 and to the upwind bearing 200. The bottom part 81 of the bearing housing 80 is located underneath the drive shaft 90 in a direction of gravity G. An internal space 82 of the bearing housing 80 is formed between the bearing housing 80 and the drive shaft 90. Lubricant may leak from the downwind bearing 100 and the upwind bearing 200 into the internal space 82 and thereby be collected in the bottom part 81.

Two inner sides 84.1, 84.2 of the bottom part 81 of the bearing housing 80 are facing the drive shaft 90. The inner side 84.1 is provided with a slope extending from the drain outlet 83 in an axial direction along the longitudinal axis A to the upwind bearing 200. The slope of the inner side 84.1 is arranged at an angle $\alpha_{84.1}$ to a line perpendicular to the direction of gravity G. The inner side 84.2 is provided with a slope extending from the drain outlet 83 in an axial direction along the longitudinal axis A to the downwind bearing 100. The slope of the inner side 84.2 is arranged at an angle $\alpha_{84.2}$ to the line perpendicular to the direction of gravity G. Thereby, the two inner sides 84.1, 84.2 of the bottom part 81 of the bearing housing 80 form a funnel 85. Lubricant leaked from the downwind bearing 100 and the upwind bearing 200 may flow along the funnel 85 to the drain outlet 83 without any distractions and external help.

The bottom part 81 of the bearing housing 80 also comprises an outer side 86 directed away from the internal space 82 of the bearing housing 80 or facing away from the drive shaft 90. The outer side 86 is located on the opposite side of the inner sides 84.1, 84.2. The outer side 86 is flat in that it is arranged perpendicular to the direction of gravity G.

Figure 4:
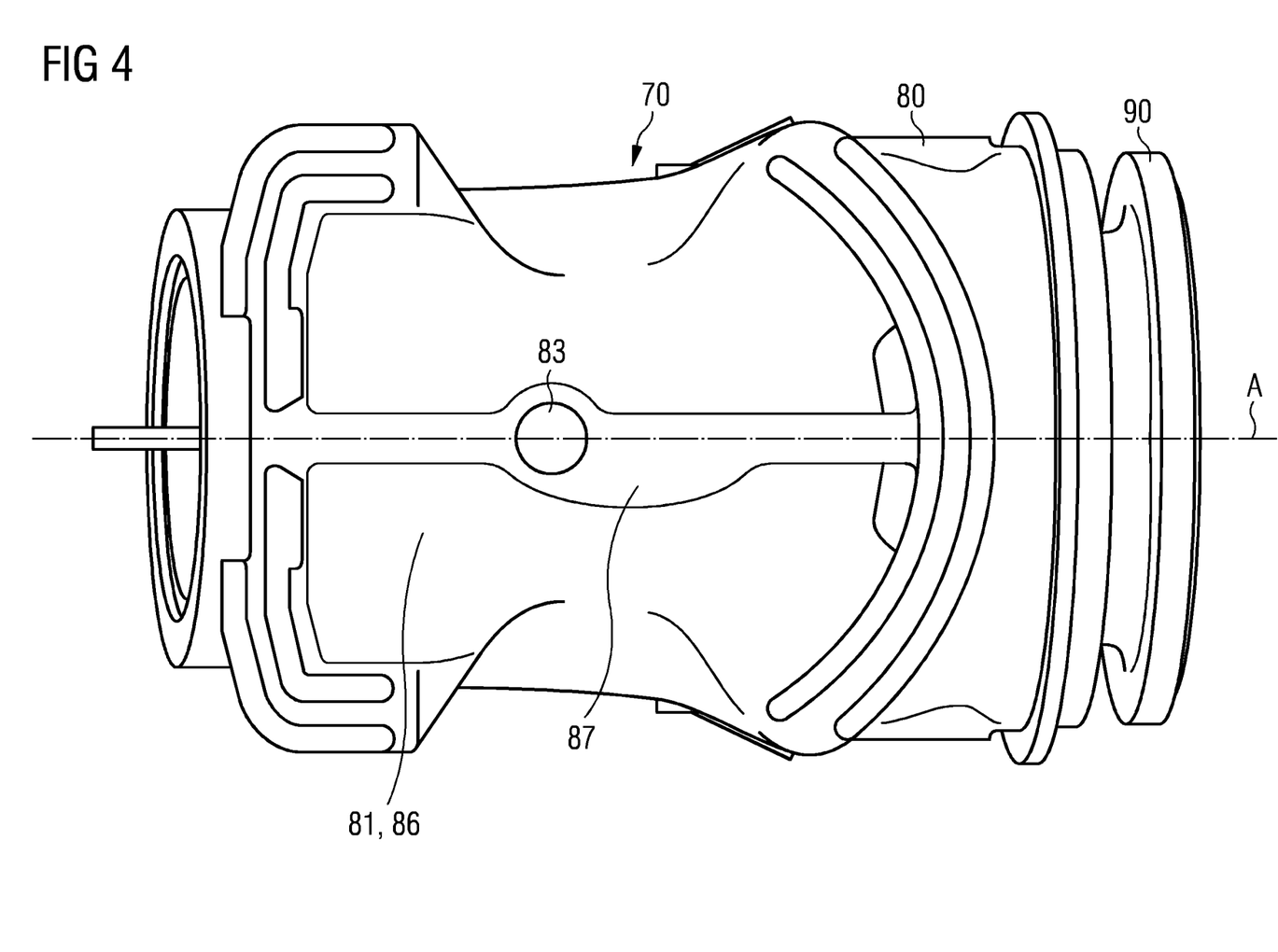
FIG. 4 depicts a bottom view on the bearing arrangement of FIG. 2.

FIG. 4 shows a bottom view on the bearing arrangement 70 of FIG. 2. A collecting sump 87 having a longitudinal extension in the axial direction A of the bearing housing 80 is attached to the bottom part 81, in particular the outer side 86, by means of bolts. The collecting sump 87 comprises a drain opening corresponding in location and size to the drain outlet 83 for fluidically connecting the opening of the collecting sump 87 to a lubricant pump 88 as shown in FIG. 5 and recirculating lubricant collected in the collecting sump 87 to inlets (not shown) of the downwind bearing 100 and/or the upwind bearing 200.

Figure 5:
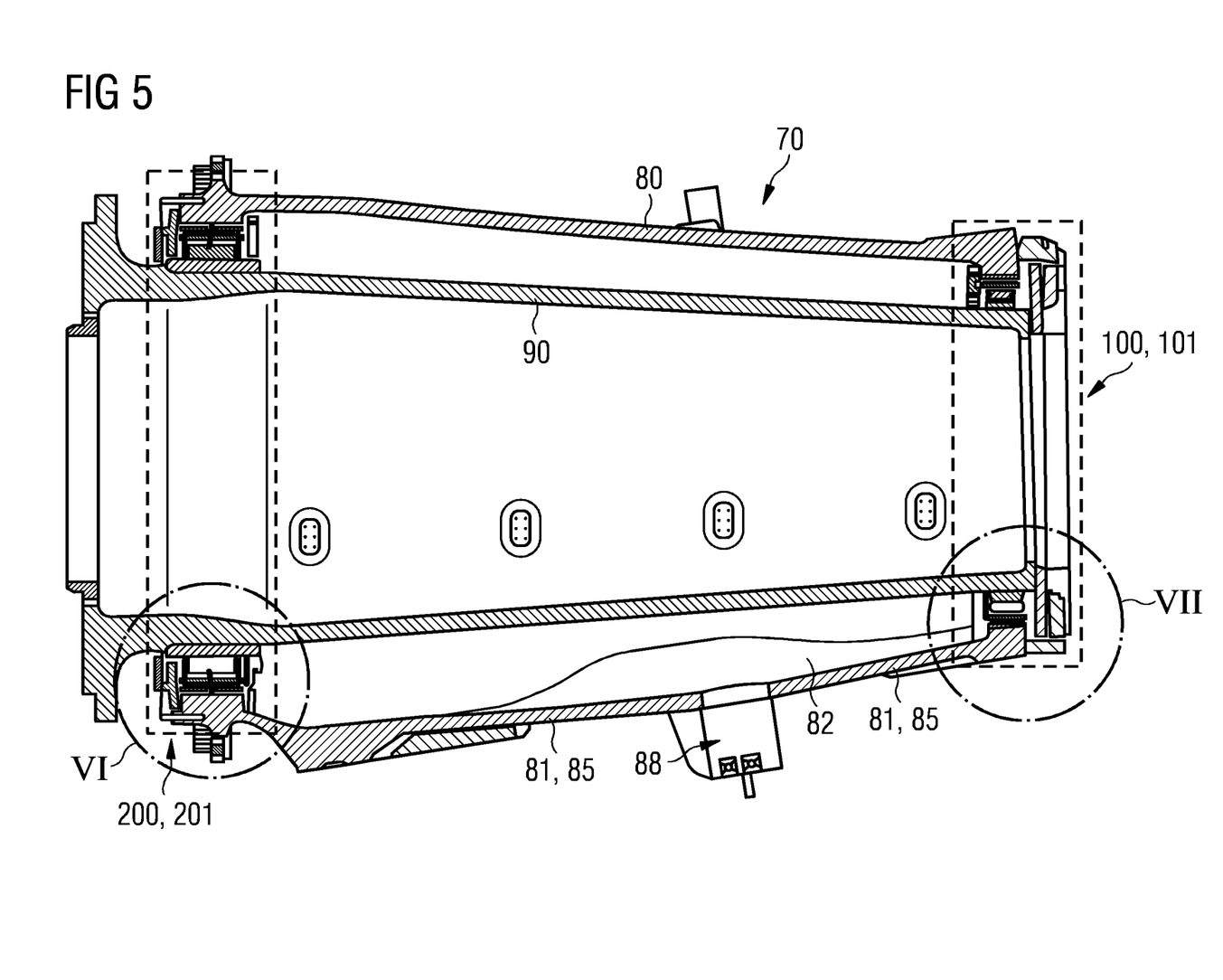
FIG. 5 depicts a side view on a sectional cut along another bearing arrangement of the wind turbine of FIG. 1.

FIG. 5 shows a side view on a sectional cut along another bearing arrangement 70 of a wind turbine 10. Here, a lubricant pump 88 fluidically connected to the drain outlet 83 of the bearing housing 80 is shown. Moreover, the downwind bearing 100 with its lubricant flooded chamber 101 and the upwind bearing 200 with its lubricant flooded chamber 201 are shown, the principle and features of which will further be explained with reference to FIG. 6 and FIG. 7.

Figure 6:
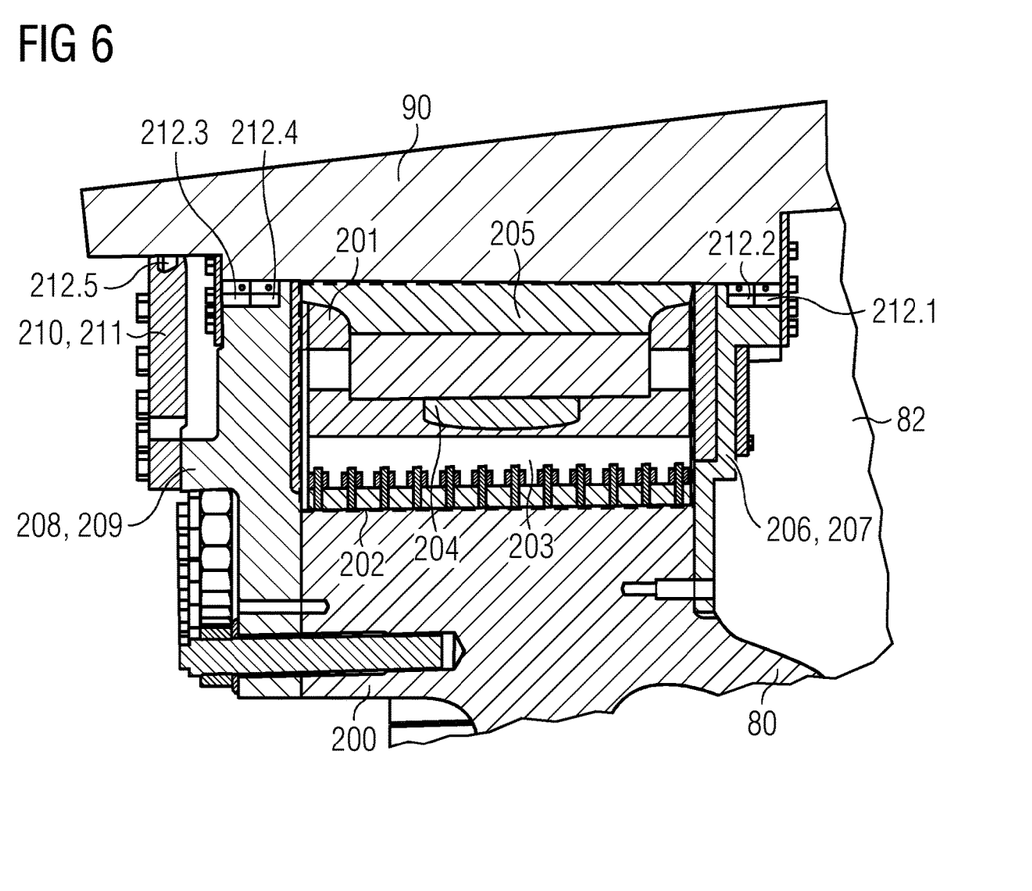
FIG. 6 depicts a view on a detail of the bearing arrangement of FIG. 5.

FIG. 6 shows an enlarged view on the sectional cut through the upwind bearing 200 and its lubricant flooded chamber 201 according to the detail VI of FIG. 5. A radial bearing body 203 is attached to a bearing housing 80. Specifically, the radial bearing body 203 is attached to a cylindrical seat 202 formed by the bearing housing 80. A radial tiltable support structure 204 is secured to the radial bearing body 203. A radial bearing pad 205 is attached to the radial tiltable support structure 204. The radial bearing pad 205 is arranged in sliding contact with the drive shaft 90. The radial tiltable support structure 204 allows for a tilting movement of the radial bearing pad 205 with respect to the drive shaft 90. Multiple of such radial bearing units comprising a radial bearing body 203, a radial tiltable support structure 204 and a radial bearing pad 205 are arranged in a series along the cylindrical seat 202 in the lubricant flooded chamber 201, in particular a circumference of the cylindrical seat 202.

The lubricant flooded chamber 201 of the upwind bearing 200 is sealed by means of an inner sealing 206 against the internal space 82 of the bearing housing 80. The inner sealing 206 of the lubricant flooded chamber 201 of the upwind bearing 200 comprises multiple inner sealing plates 207, which will be explained in detail with reference to FIG. 9. Two lip seals 212.1, 212.2 are arranged in series between the inner sealing 206 and the drive shaft 90 so as to seal the sealing 206 against the drive shaft 90.

The lubricant flooded chamber 201 of the upwind bearing 200 is sealed against an outside of the bearing housing 80 by means of an outer sealing 208 and a dust sealing 210. The outer sealing 208 comprises an outer seal plate 209 and two lip seals 212.3, 212.4 arranged in series in between the outer seal plate 209 and the drive shaft 90. The dust sealing 210 is formed by a dust seal plate 211 and a further lip seal 212.5 arranged between the dust seal plate 211 and the drive shaft 90. The dust sealing 210 is located towards the outside of the bearing housing 80. The dust sealing 210 sandwiches the outer sealing 208 in between the dust sealing 210 and the lubricant flooded chamber 201.

Figure 7:
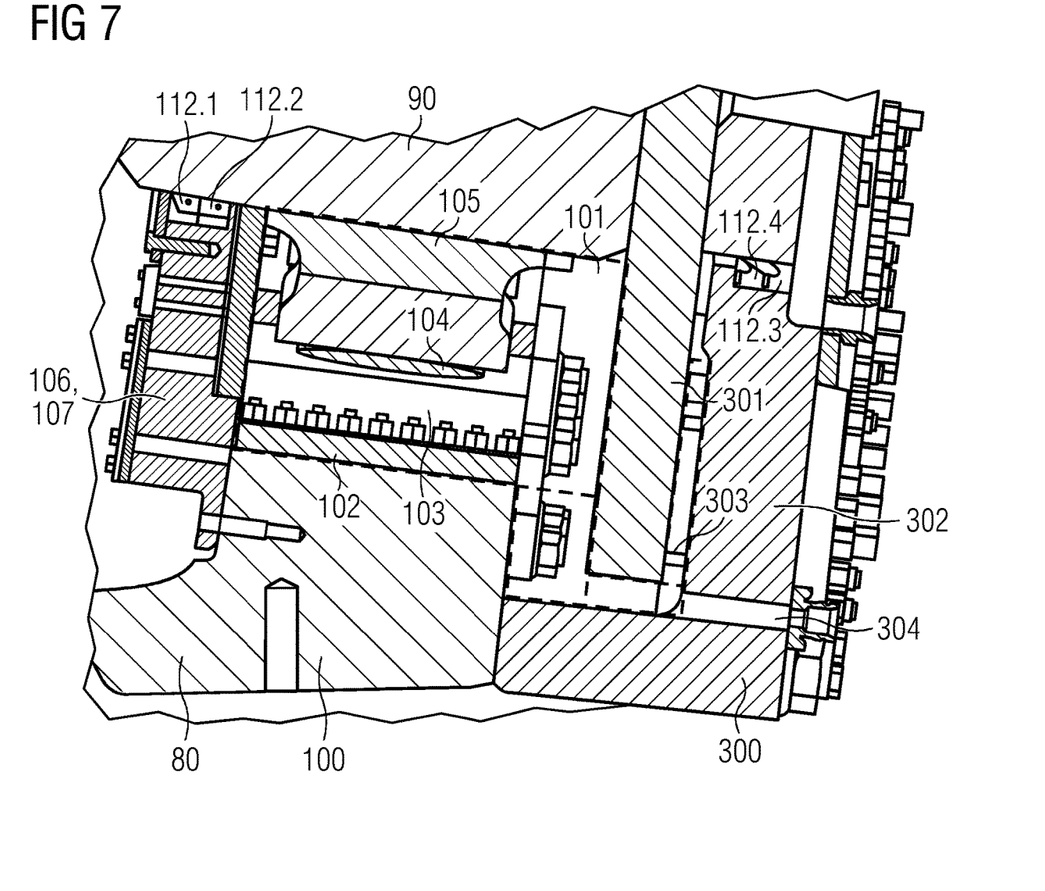
FIG. 7 depicts a view on a further detail of the bearing arrangement of FIG. 5.

FIG. 7 shows an enlarged view on the sectional cut through the downwind bearing 100 and its lubricant flooded chamber 101 according to the detail VII of FIG. 5. A radial bearing body 103 is attached to the bearing housing 80. Specifically, the radial bearing body 103 is attached to a cylindrical seat 102 formed in the bearing housing 80. A radial tiltable support structure 104 is secured to the radial bearing body 103. A radial bearing pad 105 is attached to the radial tiltable support structure 104. The radial bearing pad 105 is arranged in sliding contact with the drive shaft 90. The radial tiltable support structure 104 allows for a tilting movement of the radial bearing pad 105 with respect to the drive shaft 90. Multiple of such radial bearing units comprising a radial bearing body 103, a radial tiltable support structure 104 and a radial bearing pad 105 are arranged in a series along the cylindrical seat 102 in the lubricant flooded chamber 101, in particular a circumference of the cylindrical seat 102.

The lubricant flooded chamber 101 of the upwind bearing 100 is sealed by means of an inner sealing 106 against the internal space 82 of the bearing housing 80. The inner sealing 106 of the lubricant flooded chamber 101 of the downwind bearing 100 comprises multiple inner sealing plates 107, which will be explained in detail with reference to FIG. 10. Two lip seals 112.1, 112.2 are arranged in series between the inner sealing 106 and the drive shaft 90 so as to seal the sealing 106 against the drive shaft 90.

The lubricant flooded chamber 101 is fluidically connected to an effective path provided by a lubricant flow channel 303 of an axial bearing 300 of the bearing arrangement 70. The axial bearing 300 comprises an axial collar 301 and multiple axial bearing pads (not shown here, because the sectional cut is set through the axial bearing stop 302) attached to an axial bearing stop 302. The axial collar 301 is attached to the drive shaft 90. The axial collar 301 extends outwards from the drive shaft 90. The axial collar 301 extends along an entire circumference of the drive shaft 90. The lubricant flow channel 303 of the axial bearing 300 is formed between the axial collar 301 and the multiple axial bearing pads of the axial bearing stop 302. An overflow channel 304 of the axial bearing 300 is arranged in fluidical contact with the lubricant flooded chamber 101. By means of the overflow channel 304, excessive lubricant may be released out of the lubricant flooded chamber 101. The overflow channel 304 may be connected to the internal space 82 for releasing the lubricant into the bearing housing 80. The downwind bearing 100 has the axial bearing 300 as a sealing of the lubricant flooded chamber 101 against the outside of the bearing housing 80.

Figure 8:
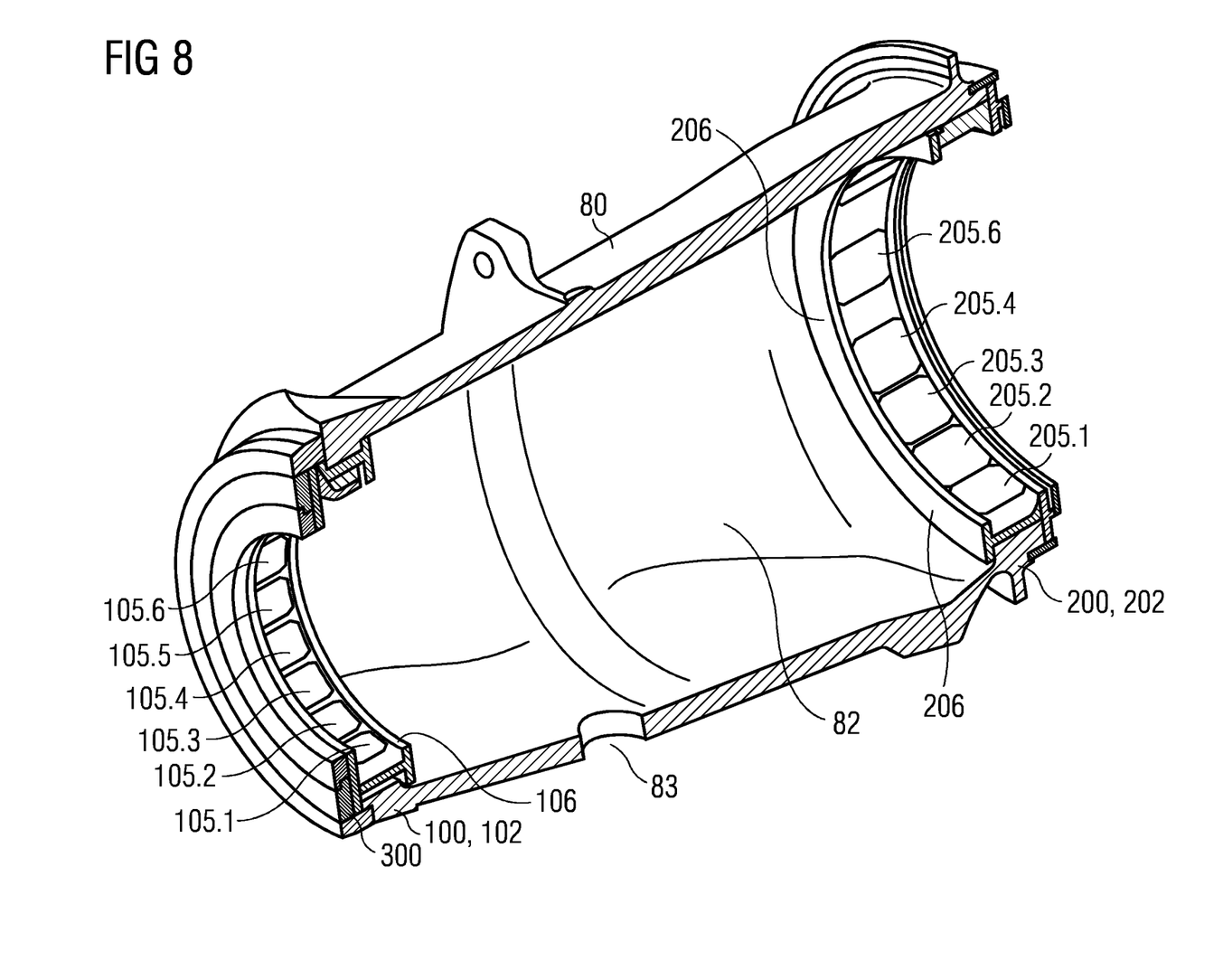
FIG. 8 depicts a side perspective view on a sectional cut along the bearing housing of the wind turbine of FIG. 5.

FIG. 8 shows a side perspective view on a sectional cut along the bearing housing 80 of FIG. 5 and through the drain outlet 83. As can be seen, there are multiple radial bearing pads 105.1, 105.2, 105.3, 105.4, 105.5, 105.6 arranged as a series in the cylindrical seat 102 of the downwind bearing 100. The inner sealing 106 is arranged between the radial bearing pads 105.1, 105.2, 105.3, 105.4, 105.5, 105.6 and the internal space 82 of the bearing housing 80 and attached to the bearing housing 80, in particular to the cylindrical seat 102.

Moreover, the axial bearing 300 is arranged at the bearing housing 80 next to the downwind bearing 100. Moreover, there are multiple radial bearing pads 205.1, 205.2, 205.3, 205.4, 205.5, 205.6 arranged in the cylindrical seat 202 of the upwind bearing 200. The inner sealing 206 is arranged between the radial bearing pads 205.1, 205.2, 205.3, 205.4, 205.5, 205.6 and the internal space 82 of the bearing housing 80 and attached to the bearing housing 80, in particular to the cylindrical seat 202.

Figure 9:
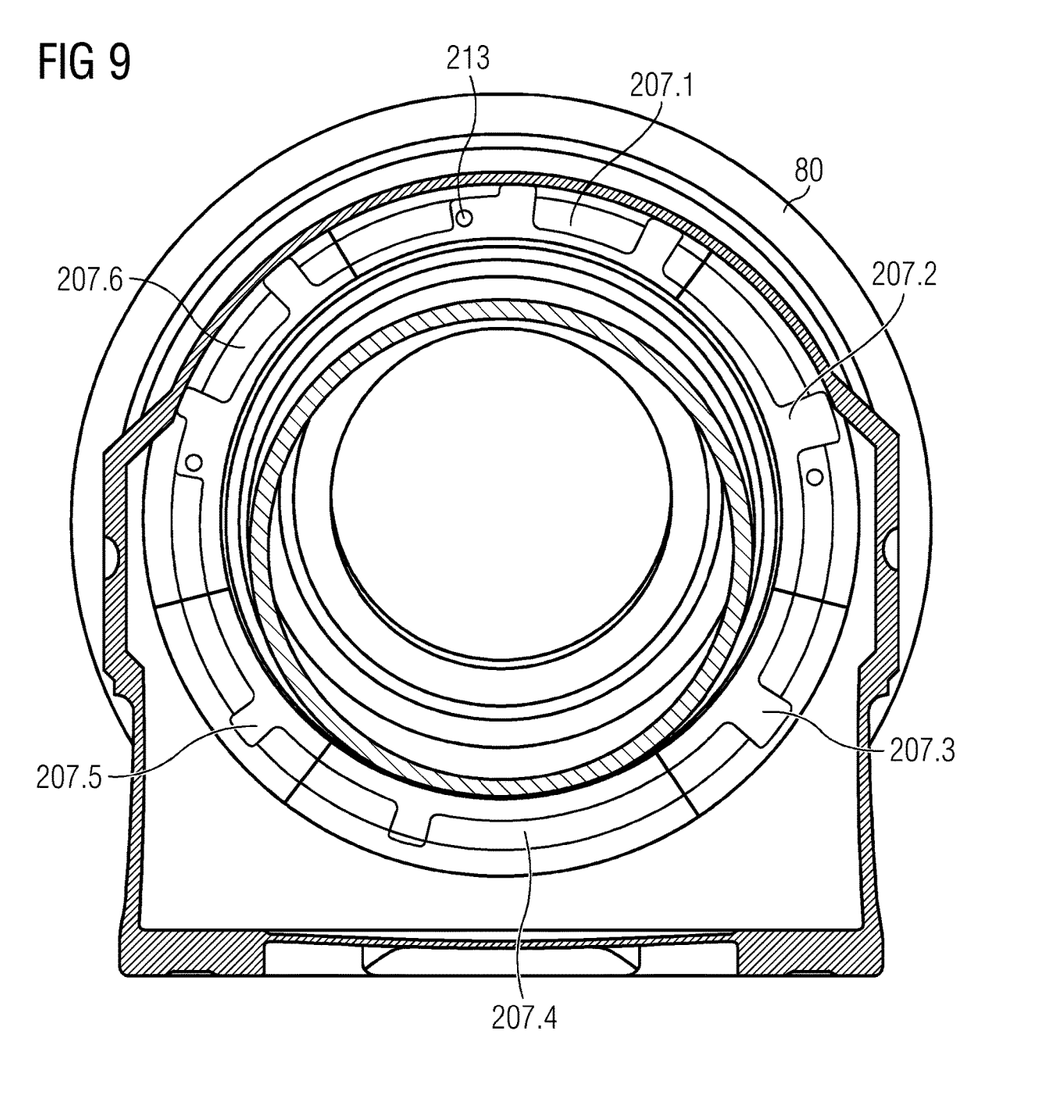
FIG. 9 depicts a front side view on a sectional cut perpendicular to the longitudinal axis of the upwind bearing of the bearing housing of FIG. 8.

FIG. 9 shows a front side view on a sectional cut perpendicular to the longitudinal axis A of the upwind bearing 200 of the bearing housing 80 of FIG. 8. Thereby, a view from the internal space 82 of the bearing housing 80 onto the inner sealing 206 is provided. The inner sealing 206 comprises six inner sealing plates 207.1, 207.2, 207.3, 207.4, 207.5, 207.6. The inner sealing plates 207.1, 207.2, 207.3, 207.4, 207.5, 207.6 have a part-circular shape and are arranged so as to form the circular shaped inner sealing 206 for sealing the lubricant flooded chamber 101 against the internal space 82 of the bearing housing 80. The inner sealing plates 207.1, 207.2, 207.3, 207.4, 207.5, 207.6 have different sizes for enabling an easier manufacturing and favorable weight distribution of the inner sealing 206 along the cylindrical seat 201. The inner sealing plate 207.1, which is arranged at the top of the inner sealing 206, comprises an overflow opening 213 from the lubricant flooded chamber 201 to the internal space 82 of the bearing housing 80. The overflow opening 213 may be or comprise a channel or pipe leading into the bearing housing 80.

Figure 10:
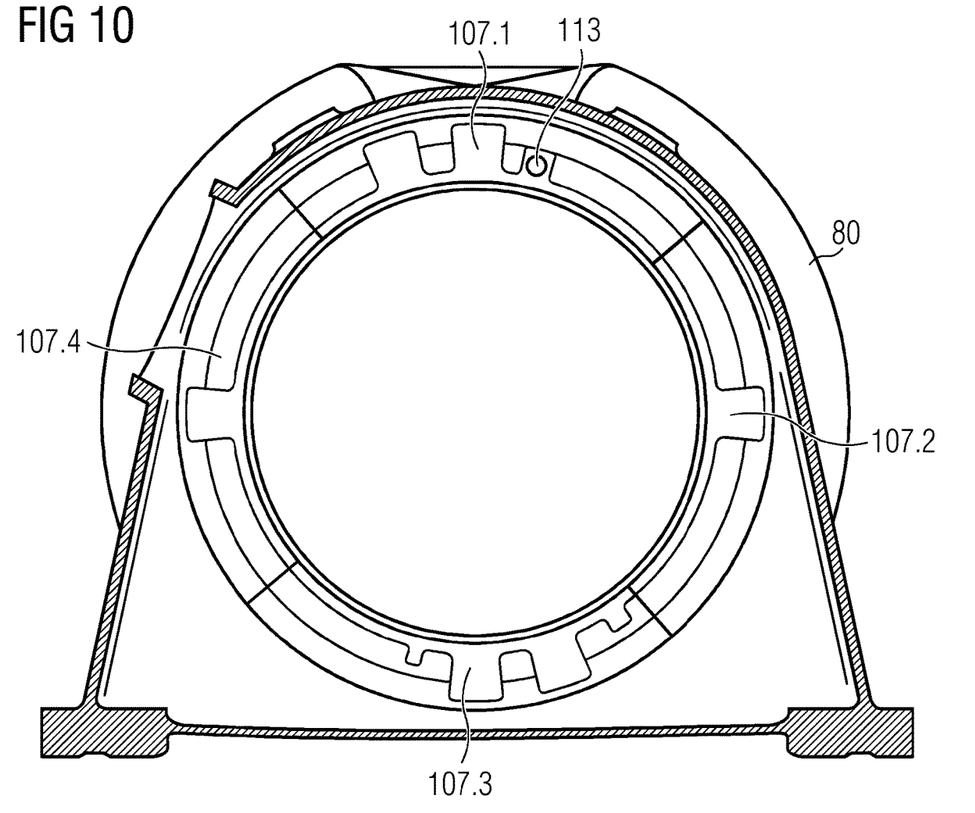
FIG. 10 depicts a front side view on a sectional cut perpendicular to the longitudinal axis of the downwind bearing of the bearing housing of FIG. 8.

FIG. 10 shows a front side view on a sectional cut perpendicular to the longitudinal axis A of the downwind bearing 100 of the bearing housing 80 of FIG. 8. Thereby, a view from the internal space 82 of the bearing housing 80 onto the inner sealing 106 is provided. The inner sealing 106 comprises four inner sealing plates 107.1, 107.2, 107.3, 107.4. The inner sealing plates 107.1, 107.2, 107.3, 107.4 have a part-circular shape and are arranged so as to form the circular shaped inner sealing 106 for sealing the lubricant flooded chamber 101 against the internal space 82 of the bearing housing 80. The inner sealing plates 107.1, 107.2, 107.3, 107.4 have the same size. The inner sealing plate 107.1, which is arranged at the top of the inner sealing 106, comprises an overflow opening 113 from the lubricant flooded chamber 101 to the internal space 82 of the bearing housing 80. The overflow opening 113 may be or comprise a channel or a pipe leading into the bearing housing 80.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A bearing arrangement for a wind turbine comprising:
a bearing housing;
a drive shaft arranged within the bearing housing in an axial direction along a longitudinal axis of the bearing housing; and
a downwind bearing and an upwind bearing as radial fluid bearings, the downwind bearing and the upwind bearing being arranged between the bearing housing and the drive shaft;
a first lubricant flooded chamber arranged at the downwind bearing, in which radial bearing pads of the downwind bearing are arranged about the drive shaft, the first lubricant flooded chamber being sealed against the drive shaft, an internal space of the bearing housing, and an outside of the bearing housing, proximate the downwind bearing, wherein the first lubricant flooded chamber is located between an exterior surface of the bearing housing and the internal space of the bearing housing, and the radial bearing pads are arranged in a series along a cylindrical seat within the lubricant flooded chamber;
a second lubricant flooded chamber arranged at the upwind bearing, in which radial bearing pads of the downwind bearing are arranged about the drive shaft, the second lubricant flooded chamber being sealed against the drive shaft, the internal space of the bearing housing, and the outside of the bearing housing, proximate the upwind bearing;
wherein the first lubricant flooded chamber and the second lubricant flooded chamber each comprise a lubricant inlet;
wherein the lubricant inlet of the first lubricant flooded chamber and the second lubricant flooded chamber is fluidically connected via a lubricant pump to the bearing housing.

2. The bearing arrangement according to claim 1, wherein the first lubricant flooded chamber and the second lubricant flooded chamber is connected to a drain outlet of the bearing housing or a collecting sump of the bearing housing, further wherein the collecting sump is arranged underneath the drain outlet.

3. The bearing arrangement according to claim 1, wherein the second lubricant flooded chamber is fluidically connected to an effective path provided by a lubricant flow channel of an axial bearing of the bearing arrangement.

4. The bearing arrangement according to claim 3, wherein the axial bearing comprises an axial collar and multiple axial bearing pads attached to an axial bearing stop, further wherein the lubricant flow channel of the axial bearing is formed between the axial collar and the multiple axial bearing pads.

5. The bearing arrangement according to claim 1, wherein the downwind bearing and/or the upwind bearing is a radial fluid bearing comprising a cylindrical seat within the bearing housing, multiple radial bearing bodies arranged on the cylindrical seat and multiple radial tiltable support structures secured to the multiple radial bearing bodies, further wherein each one of a multiple radial bearing pads is attached to one of the multiple radial tiltable support structures.

6. The bearing arrangement according to claim 1, wherein the downwind bearing and/or the upwind bearing comprises an inner sealing for sealing the first lubricant flooded chamber and/or the second lubricant flooded chamber against the internal space of the bearing housing, further wherein the inner sealing comprises multiple inner sealing plates.

7. The bearing arrangement according to claim 6, wherein the multiple inner sealing plates have a part-circular shape and are arranged so as to form a circular shaped inner sealing.

8. The bearing arrangement according to claim 6, wherein at least one of the inner sealing plates comprises at least one overflow opening from the first lubricant flooded chamber and/or the second lubricant flooded chamber to the internal space of the bearing housing.

9. The bearing arrangement according to claim 1, wherein the downwind bearing and/or the upwind bearing comprises an outer sealing for sealing the first lubricant flooded chamber and/or the second lubricant flooded chamber against the outside of the bearing housing, further wherein the outer sealing comprises an outer seal plate.

10. The bearing arrangement according to claim 9, wherein the outer sealing comprises at least one lip seal for sealing the outer sealing against the drive shaft.

11. The bearing arrangement according to claim 10, wherein a dust sealing is attached to the outer sealing for preventing the entering of dust into the first lubricant flooded chamber and/or the second lubricant flooded chamber through the at least one lip seal of the outer sealing, further wherein the dust sealing comprises a dust seal plate and a further lip seal.

12. The bearing arrangement according to claim 1, wherein the first lubricant flooded chamber and the second lubricant flooded chamber each comprise a lubricant level sensor.

13. A wind turbine comprising the bearing arrangement according to claim 1, wherein the wind turbine further comprises a rotor operatively connected to drive the drive shaft and a generator operatively connected to be driven by the drive shaft.

* * * * *